(12) United States Patent
Kummer

(10) Patent No.: US 8,380,050 B2
(45) Date of Patent: Feb. 19, 2013

(54) RECORDING EXTENSION OF DELAYED MEDIA CONTENT

(75) Inventor: David A. Kummer, Highlands Ranch, CO (US)

(73) Assignee: EchoStar Technologies LLC, Englewood, CO (US)

( * ) Notice: Subject to any disclaimer, the term of this patent is extended or adjusted under 35 U.S.C. 154(b) by 263 days.

(21) Appl. No.: 12/702,999

(22) Filed: Feb. 9, 2010

(65) Prior Publication Data

US 2011/0197251 A1    Aug. 11, 2011

(51) Int. Cl.
*H04N 5/76* (2006.01)
*G06F 3/00* (2006.01)

(52) U.S. Cl. .......... 386/292; 386/297; 386/298; 725/58

(58) Field of Classification Search ................... 386/292, 386/297, 298; 725/58
See application file for complete search history.

(56) References Cited

U.S. PATENT DOCUMENTS

| | | | |
|---|---|---|---|
| 2003/0198461 A1 | 10/2003 | Taylor et al. | |
| 2006/0222327 A1 | 10/2006 | Abe et al. | |
| 2009/0133092 A1 | 5/2009 | Casagrande | |
| 2009/0257732 A1 | 10/2009 | Callaway et al. | |

FOREIGN PATENT DOCUMENTS

| | | |
|---|---|---|
| DE | 102005021243 | 11/2006 |
| EP | 1571840 | 9/2005 |
| EP | 1622371 | 2/2006 |

OTHER PUBLICATIONS

European Search Report dated May 27, 2011, EP 11153752.8, 8 pages.
"Digital TV—Nielsen DVR Penetration and Measurement" retrieved from Multiplatform internet site located at http://www.tvb.org/multiplatform/Digital_TV/Nielsen_DVR_Measurement.aspx on Feb. 18, 2010, 2 pages.

*Primary Examiner* — Hoang-Vu A Nguyen-Ba
(74) *Attorney, Agent, or Firm* — Seed IP Law Group PLLC

(57) ABSTRACT

Presented herein is a method of extending a recording in a media content receiver of a media event that is delayed. In the method, a recording of media content is begun at an expected start time for the media event based on a recording timer, wherein the recording timer indicates the expected start time and an expected end time for the media event. After beginning the recording, the media content being recorded is analyzed to determine an actual start time for the media event. The actual start time is then compared with the expected start time. If the difference between the actual start time and the expected start time exceeds some predetermined value, the expected end time is adjusted to extend the recording. The recording is then ended at the adjusted end time.

15 Claims, 6 Drawing Sheets

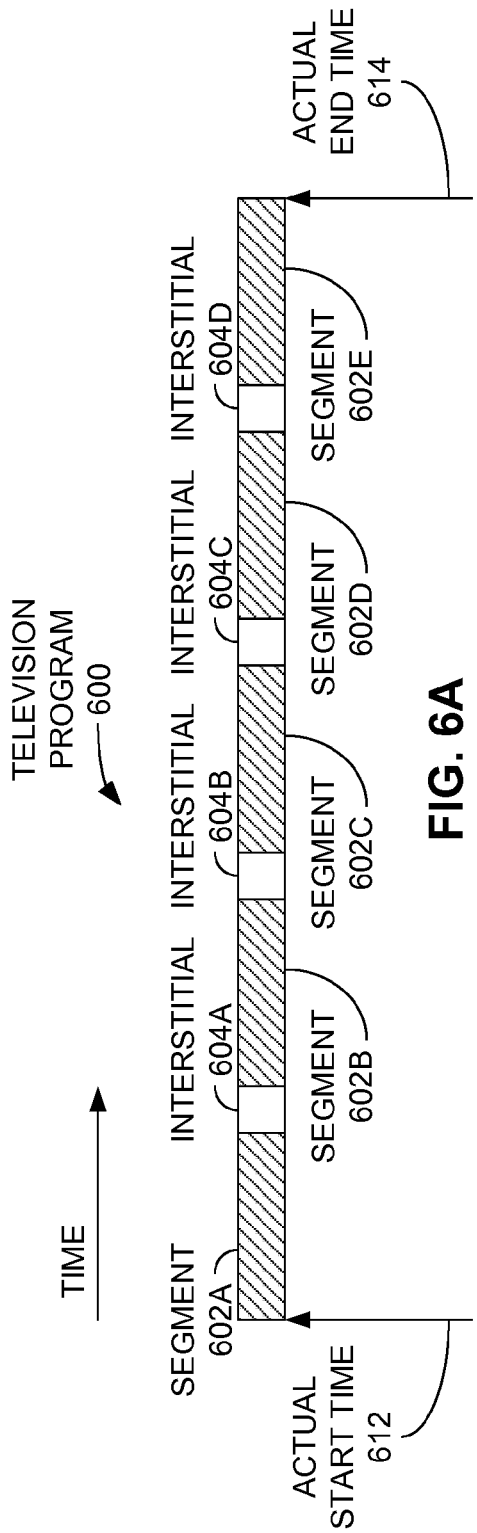
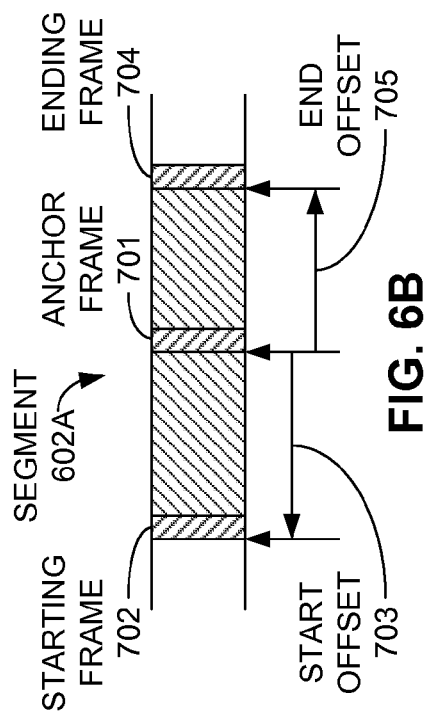

RECORDING EXTENSION OF DELAYED MEDIA CONTENT

BACKGROUND

For many years, viewers of broadcast television content, such as movies, news programs, weekly television episodes, sporting events, and the like, have taken fully advantage of the ability to record their favorite programs for subsequent viewing at a latter, more convenient time. This ability was first made widely available via the video cassette recorder (VCR), and more recently by way of the digital video recorder (DVR) or personal video recorder (PVR). With DVR technology, users may simply select a program to record from an electronic program guide (EPG) presented to the user via a television display. Further, the user may also be able to record each instance of a recurring program, such as a weekly episode, by setting a single recording timer in the DVR unit, which may be a standalone device, or a sub-unit incorporated into a satellite, cable, or terrestrial television receiver. In many cases, the user may also manually add or subtract time from the beginning and end of the program to account for small differences between the scheduled broadcast time and the typical broadcast time for the program.

While product developers continue to improve and simplify the user's interaction with a DVR for home recording of television programs, some unpredictable situations regarding the timing of television program broadcasts continue to make error-free recording difficult to attain. For example, due to unforeseen circumstances, a television presentation preceding a program for which a recording timer has been set may continue beyond its schedule ending time, thus delaying the program to be recorded by some unknown amount of time. As a result, while the beginning of the program may be recorded, the recording may end prior to the actual end of the selected program due to the unanticipated delay. In cases in which a program selected for recording has been rescheduled well in advance, the provider of EPG data residing in the DVR unit may be able to update the EPG data remotely, resulting in the associated recording timer being adjusted accordingly. However, if the program to be recorded is delayed with little or no warning, the EPG data provider would need to provide the unlikely capability of updating the EPG data in the recording DVR unit in real time for all programming channels to yield a proper recording of the program.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIGS. 6A and 6B provide two different graphical representations of a television program to be recorded which is logically partitioned into segments according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
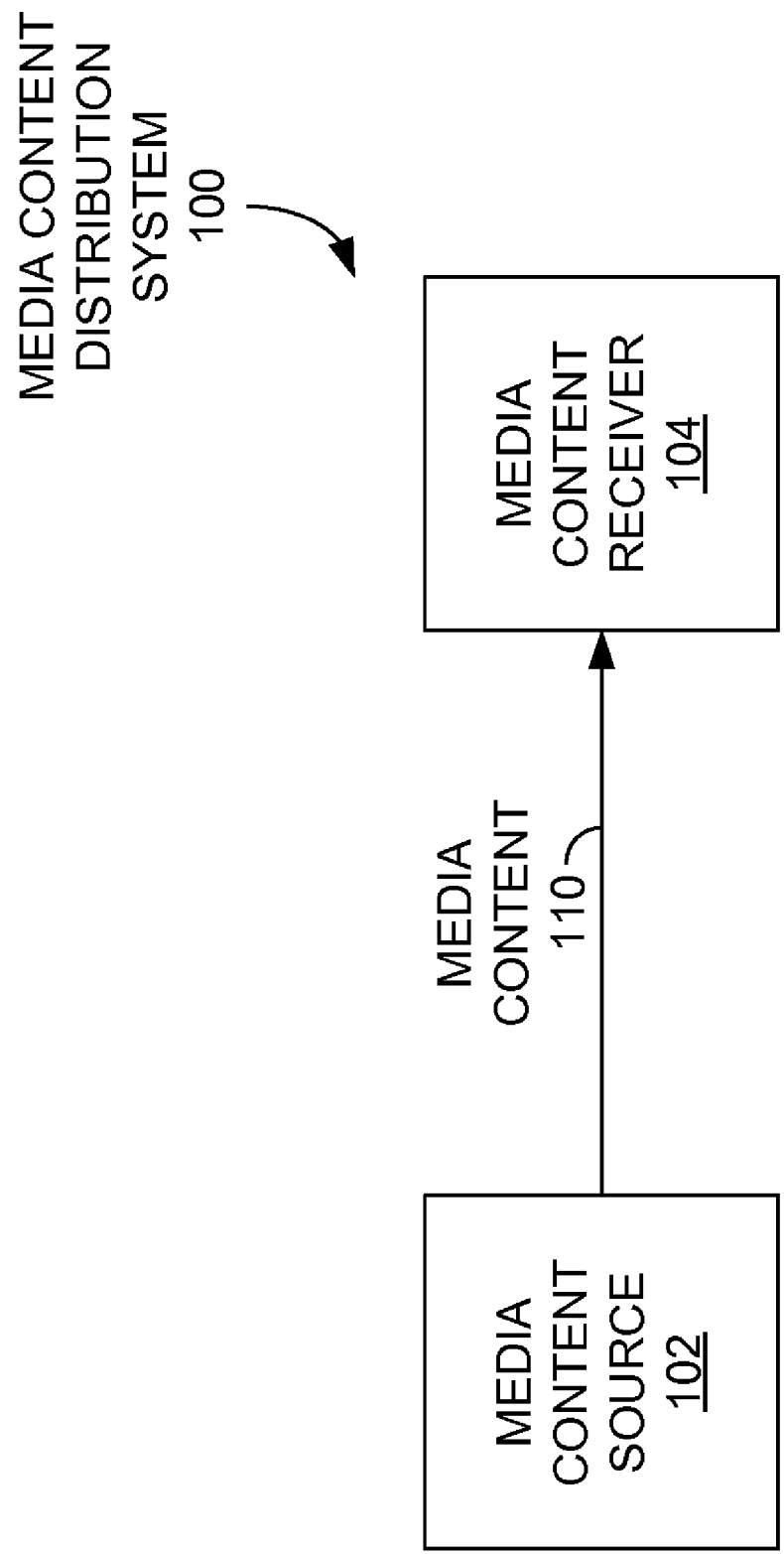
FIG. 1 is a simplified block diagram of a media content distribution system according to an embodiment of the invention.

FIG. 1 is a block diagram of a simplified media content distribution system 100 in which a media content source 102 transmits media content 110 to a media content receiver 104. Examples of the media content distribution system 100 include but are not limited to satellite, cable, and terrestrial ("over-the-air") television broadcast systems. Other content distribution systems 100 may include satellite radio networks, cellular phone networks (including third generation, or "3G", networks), and the Internet, or other wide-area network (WAN) or local-area network (LAN) communication systems, whether or not of a broadcast variety. The system 100 may employ any wired or wireless transmission, or some combination thereof, for transmitting the media content 110 from the media content source 102 to the media content receiver 104. The media content 110 may include any audio and/or visual information to be consumed by a user.

The media content source 102 may be any source of the content 110, including those sources 102 which generate the actual content 110, and those sources 102 which receive the content 110 from another source before forwarding the content 110 to another device. Examples of the media content source 102 include but are not limited to satellite television uplink centers, cable television head-ends, terrestrial television transmitters, Internet and other WAN servers, and desktop and laptop computers.

The media content receiver 104 may be any device configured to receive the media content 110 and present that content 110 in some form to a user of the receiver 104. Moreover, as is described in greater detail below, the media content receiver 104 is configured to record the received media content 110 for presentation to the user at a subsequent time of the user's choosing. Examples of the media content receiver 104 may include but are not limited to television set-top boxes incorporating a DVR device, a standalone DVR unit, television units and audio receivers possessing a content recording capability, and portable communication devices, such as cellular phones and personal digital assistants (PDAs). The media content receiver 104 may also forward the media content 110 to an output device, such as a television, video monitor, and/or audio receiver, or may incorporate such a device therein to present the content 110 directly to the user.

Figure 2:
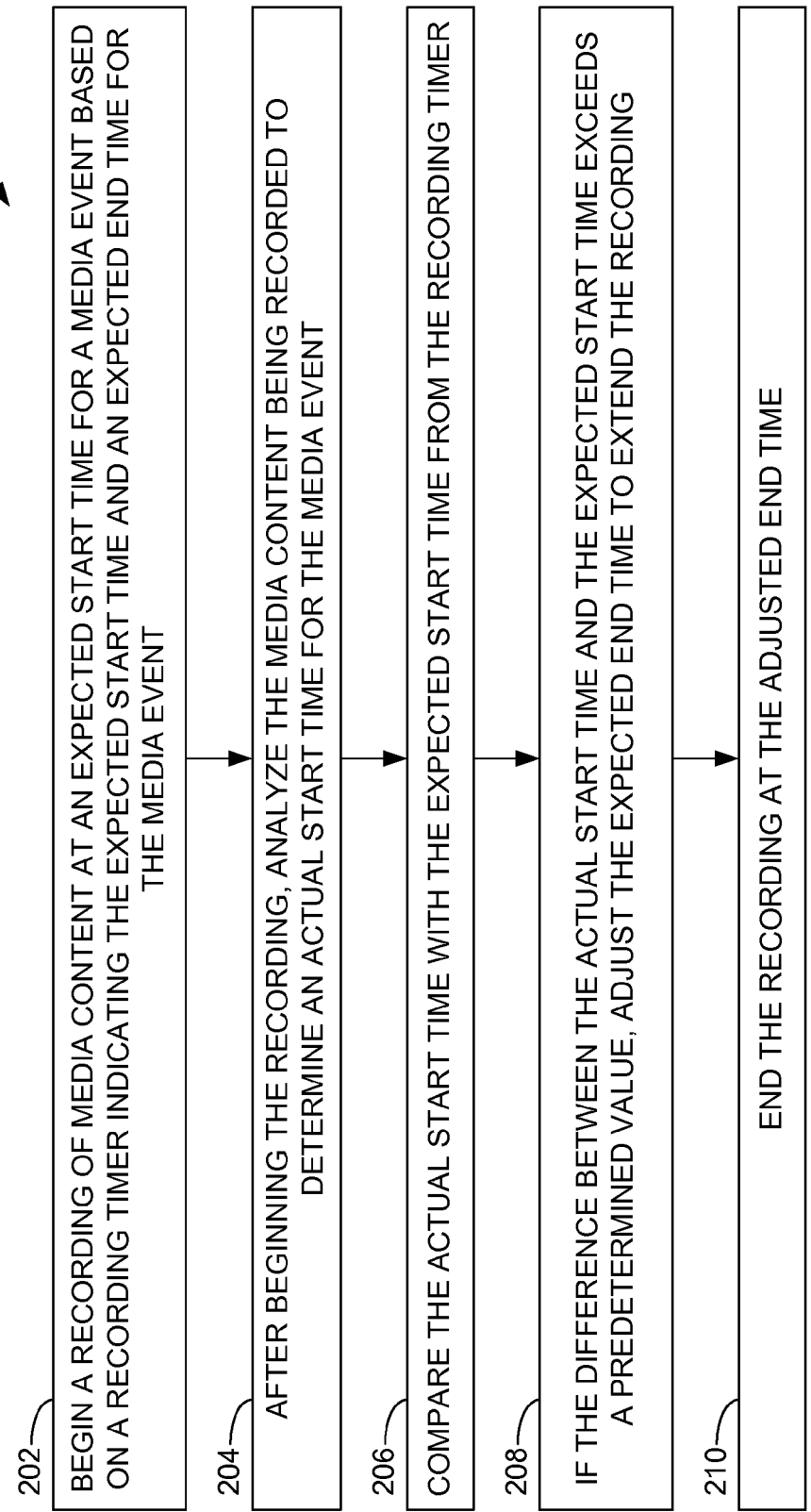
FIG. 2 is a flow diagram of a method according to an embodiment of the invention of extending a recording in a media content receiver of a delayed media event.

FIG. 2 presents a method 200 of extending a recording in a media content receiver (such as the receiver 104 of FIG. 1) of a delayed media event, which may be represented in the media content 110 shown in FIG. 1. In the method 200, the media content receiver 104 begins a recording of the media content 110 at an expected start time for a media event based on a recording timer (operation 202). The recording timer indicates the expected start time as well as an expected end time for the media event. After beginning the recording, the receiver 104 analyzes the media content 110 being recorded to determine an actual start time for the media event (operation 204). The receiver 104 compares the actual start time with the expected start time from the recording timer (operation 206). If the difference between the actual start time and the expected start time exceeds a predetermined value, the expected end time is adjusted to extend the recording (operation 208). In one example, the expected end time is adjusted by adding the difference thereto. The recording is then ended at the adjusted end time (operation 210).

While the operations of FIG. 2 are depicted as being executed in a particular order, other orders of execution, including concurrent or overlapping execution of two or more implied or explicit operations, may be possible. For example, once the recording is begun (operation 202), the recording operation may continue while the analysis (operation 204), comparison (operation 206), and adding operation (operation 208) are executed. In another embodiment, a computer-readable storage medium may have encoded thereon instructions for a processor or other control circuitry of an electronic device, such as the media content receiver 104 of FIG. 1, to implement the method 200.

As a result of employing the method 200, a media event, such as a television program, whose starting transmission time has been delayed may nonetheless be recorded in its entirety by extending or delaying the time at which the preset recording is to be ended. Such functionality may reduce or eliminate user frustration in situations in which a media event has been delayed, such as when a previous program has been unexpectedly delayed or lengthened, or in the wake of an impromptu interruption in preceding media content programming. Additional advantages may be recognized from the various implementations of the invention discussed in greater detail below.

Figure 3:
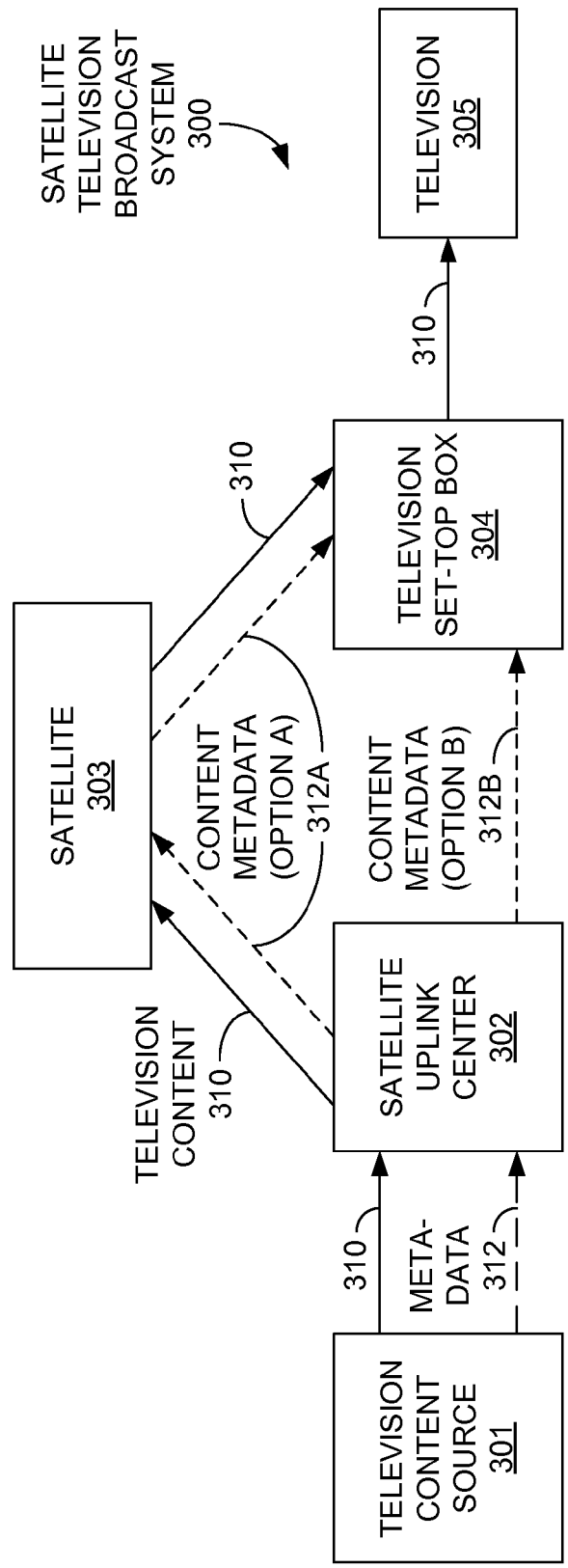
FIG. 3 is a block diagram of a satellite television broadcast system according to an embodiment of the invention.

FIG. 3 is a block diagram of a satellite television broadcast system 300 according to an embodiment of the invention. The broadcast system 300 may be viewed as a more specific example of the media content distribution system 100 of FIG. 1. As shown, the satellite television broadcast system 300 includes a television content source 301, a satellite uplink center 302, a satellite 303, a television set-top box 304, and a television 305 connected to the set-top box 304. Multiple instances of several of these devices, such as multiple content sources 301, satellites 303, set-top boxes 304, and the like, may be included, but are not explicitly shown in FIG. 3. Further, other devices coupling the various components of the broadcast system 300, such as communication servers or nodes between the satellite uplink center 302 and the set-top box 304, may be present, but are not discussed further herein to focus and simplify the following description of the various embodiments.

In the system 300 of FIG. 3, one or more television content sources, such as cable or satellite television networks and independent television outlets, provide television content 310 to the satellite uplink center 302 via satellite connection, wired communication, or other means. In one implementation, the content source 301 may also provide metadata 312 describing one or more aspects or characteristics relating to an initial or introductory portion of the transmitted television content 310. The metadata 312 is described in greater detail below.

In turn, the satellite uplink center 302 receives the television content 310, processes the content 310 for transmission, and the transmits the content 310 to one or more satellites 303 by way of at least one communication channel of a satellite uplink. The uplink may also carry other information, such as electronic program guide (EPG) data and firmware upgrades for the set-top box 304. The satellite uplink center 302 may generate at least some of the television content 310 and/or associated information internally. Also, the uplink center 302 may transmit the content metadata 312 for reception at the set-top box 304 by way of the satellite 310 (metadata 312A) or by way of a separate communication path (metadata 312B), such as by way of a telephone or Internet connection.

The satellite 303 employs at least one signal transponder (not shown in FIG. 3) to receive the various channels of content 310 and related information on the satellite uplink, and retransmit the content and additional information via a satellite downlink to the television set-top box 304, as well as other set-top boxes not illustrated in FIG. 3. The television set-top box 304 is described with greater particularity below in conjunction with FIG. 4. Typically, the set-top box 304 is configured to receive the content 310 (and the content metadata 312, if present) on the downlink via a parabolic antenna and a low-noise block-converter (LNB) attached thereto. The television set-top box 304 is configured to process and transfer the received content 310 for at least one television 305 for presentation to a user. The set-top box 304 also receives the content metadata 312 by way of the satellite 303, the uplink center 302, or some other device communicatively coupled with the set-top box 304.

Figure 4:
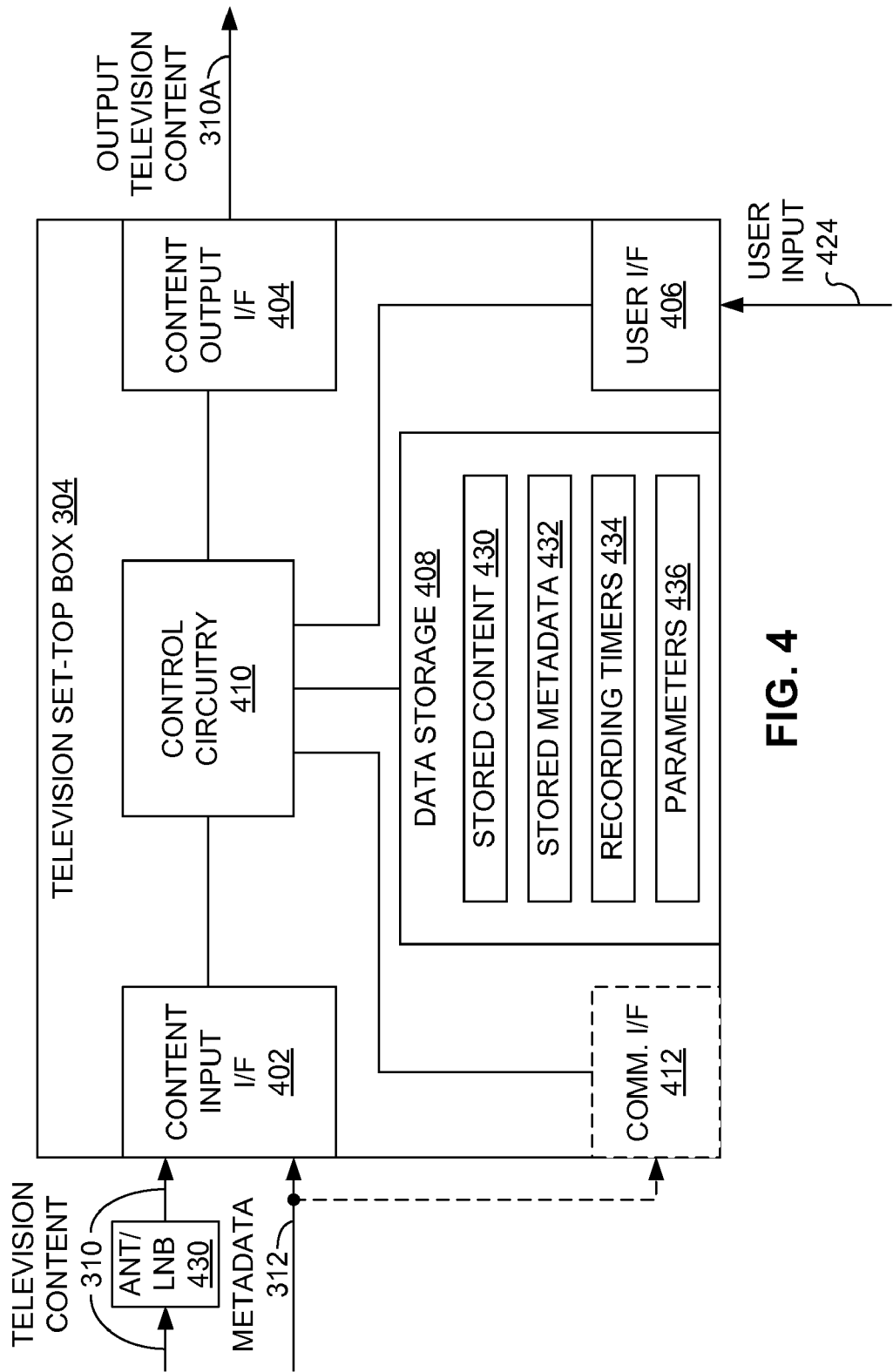
FIG. 4 is a block diagram of a television set-top box as employed in the satellite television broadcast system of FIG. 3 according to an embodiment of the invention.

An example of the television set-top box 304 of FIG. 3 is depicted in FIG. 4. In this case, the set-top box 304 includes a content input interface 402, a content output interface 404, a user interface 406, data storage 408, and control circuitry 410 coupled to the other components 402-408 of the set-top box 304. Optionally, a communication interface 412 may also be included. Other components, such as a power supply, a "smart card" interface, and so forth, may also be included in the set-top box 304, but such components are not described further herein to simplify the following discussion.

The content input interface 402 receives television content 310, such as broadcast television programming, from a content source, such as the source 301, via the satellite uplink center 302 and satellite 303 of FIG. 3. More specifically, the content input interface 402 receives the content 310 via an antenna/LNB combination 430, which receives, down-converts, and forwards the content 310 to the content input interface 402, typically via a coaxial cable. The content input interface 402 may include one or more tuners for selecting particular programming channels of the incoming content 310 for forwarding to a television, such as the television 305 of FIG. 3. The content input interface 402 may also perform any decryption, decoding, and similar processing of the received content 310 required to place the content 310 in a format usable by the content output interface 404. In one example, such a format may be one of the Motion Picture Experts Group (MPEG) formats, such as MPEG-2 or MPEG-4, although other audio/video content format standards may be utilized in other embodiments.

The content output interface 404 provides the selected and processed television content 310 as output television content 310A to the television connected thereto. To that end, the content output interface 404 may encode the selected television content in accordance with one or more television output formats. For example, the content output interface 404 may format the content 310 for one or more of a composite or component video connection with associated audio connection, a modulated radio frequency (RF) connection, and a High Definition Multimedia Interface (HDMI) connection.

To allow a user to control various functions and aspects of the set-top box 304, including the selection of programming channels for viewing and recording, the user interface 406 receives user input 424 for such purposes. In many examples, the user interface 406 may be a remote control interface configured to receive the command input 424 by way of infrared (IR), radio frequency (RF), acoustic, or other wireless signal technologies. To facilitate such information entry, the set-top box 304 may provide a menu system presented to the user via the connected television or video monitor. In some implementations, the user interface 406 may also include any of a keyboard, mouse, and/or other user input device.

The data storage 408 is configured to store several different types of information employable in the operation of the set-top box 304. As shown in FIG. 4, this information includes stored television content 430 that has been buffered or recorded for subsequent viewing, stored content metadata 432 received as metadata 312 from the satellite uplink center, one or more recording timers 434 for recording programs of interest, and parameters 436 or configuration information for controlling the operation of the set-top box 304. Other information, such as EPG information and so forth, may also be included in the data storage 408. The data storage 408 may include volatile memory, such as static and/or dynamic random-access memory (RAM), and/or nonvolatile memory, such as read-only memory (ROM), flash memory, and magnetic or optical disk memory.

The control circuitry 410 is configured to control and/or access other components of the set-top box 304. The control circuitry 410 may include one or more processors, such as a microprocessor, microcontroller, or digital signal processor (DSP), configured to execute instructions directing the processor to perform the functions discussed more fully hereinafter. The control circuitry 410 may also include memory or data storage adapted to contain such instructions, or may utilize the data storage 408 for that purpose. The memory may also include other data to aid the control circuitry 410 in performing the tasks more particularly described below. In another implementation, the control circuitry 410 may be strictly hardware-based logic, or may include a combination of hardware, firmware, and/or software elements.

As illustrated in FIG. 4, the content metadata 312 to be stored in the data storage 408 may be received via the content input interface 402. In one example, the metadata 312 may be received as part of the television content 310, with the metadata 312 referring to a subsequent program in the content 310 being transmitted. In some implementations, the metadata 312 may be transferred on a channel received at the content input interface 402 that is separate from the one or more channels carrying the television content 310. Optionally, the communication interface 412 may receive the metadata 312 via the satellite uplink center 302. The communication interface 412 may employ any of a number of communication technologies to receive the metadata 312, including both wired and wireless varieties. For example, the communication interface 412 may be an Ethernet, Wi-Fi (IEEE 802.11x), or Bluetooth® interface for connecting with an Internet gateway device for communicating with the uplink center 302 over the Internet. In another implementation, the communication interface 412 may employ a direct connection to a phone line for receiving the metadata 312.

Figure 5:
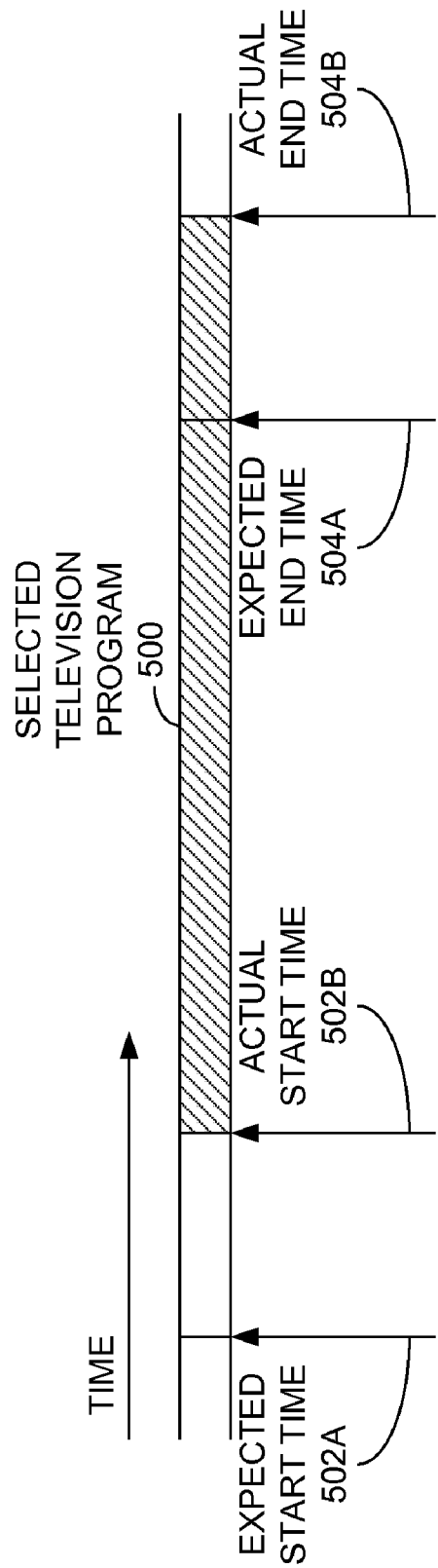
FIG. 5 is a graphical representation of a delayed television program to be recorded according to an embodiment of the invention.

In operation, the control circuitry 410 of the set-top box 304, among its other duties, is capable of determining whether a television program or media event being recorded under the control of a recording timer 434 actually started at its expected start time, and then, if not, adjusting the end time of the timer 434 accordingly. FIG. 5 provides a graphical representation of the transmission over a television channel of a television program 500 selected by the user for recording. The point in time at which the recording begins is denoted as the expected start time 502A, and the point in time at which the recording is scheduled to terminate is the expected end time 504A. A recording timer 434 stored in the data storage 408 of the set-top box 304 includes data indicating the expected start time 502A and the expected end time 504A. In the situation depicted in FIG. 5, however, the broadcast or transmission of the selected television program 500 is delayed significantly beyond the expected start time 502A to an actual start time 502B, thus causing the end of the program to extend beyond the expected end time 504A to an actual end time 504B. Thus, to prevent the recording of the program 500 from ending prior to its actual end time 504B, the control circuitry 410 is configured to revise or update the expected end time 504A in the corresponding recording timer 434 to extend the recording, possibly to the actual end time 504B of the program 500.

To accomplish this goal, the control circuitry 410 may determine the actual start time 502B of the selected program 500 by analyzing the content on the channel being recorded in view of the stored metadata 432 corresponding with the selected program or media event 500 to be recorded. In one implementation, the metadata 312 describes one or more recognizable and somewhat unique portions of the audio and/or video content of the program 500 to be recorded, possibly along with an indication of where the content portion is located within the program 500. The received metadata 312 may be delivered at any point prior to, or during an early portion of, the transmission of the program 500 to be recorded.

In FIG. 3, the metadata 312 may be delivered along the same uplink and downlink path from the satellite uplink center 302 via the satellite 303 to the set-top box 304. In the embodiment of FIG. 4, the metadata 312 received along such a path would enter the set-top box 304 at its content input interface 402. In another embodiment of FIG. 3, the metadata 312 may be received from the uplink center 302 via a terrestrial route, such as the Internet or a phone connection, to the set-top box 304. As shown in FIG. 4, the communication interface 412 is configured to receive the metadata 312 over such a path.

Also in FIG. 3, the uplink center 302 may generate the metadata 312 after receiving the selected program 500 of the television content 310 from the content source 301 and analyzing the program 500. In another example, the television content source 301 may generate the metadata 312 and transfer it to the uplink center 302 for forwarding to the set-top box 304 via either path discussed above.

In one example, the selected program 500 contains audio and video content, along with text data associated with the program 500. The text data may include closed captioning data (e.g., data adhering to the CEA-608 and/or CEA-708 standards developed by the Electronic Industries Alliance (EIA)) and/or subtitle data intended to be displayed in conjunction with the video portion of the program 500. In other implementations, text data does not accompany the audio and video content.

If text data is present as part of the selected program 500, the stored metadata 432 may contain a sample of a unique or recognizable portion of the text data presented near the beginning of the selected program 500. For example, this portion of the text data may be closed captioning data for a few words or a sentence that is generally presented at the opening segment or portion of the program 500, such as the title of the program, the name of one or more actors appearing in the program, and so on. In this example, control circuitry 410 may then analyze or search for text data of the program 500 just prior to recording, as it is being recorded, or after being recorded in the data storage 408 as stored content 430 in an attempt to find text that matches the text data sample in the stored metadata 431. In one particular example, the eXtended Data Services (XDS) portion of closed captioning data as defined under the CEA-608 standard may include the title of the program 500, which may be employed as the text data sample presuming that the title appears at or near the start of the program 500.

If such a match exists, then presuming the matching text appears near the beginning of the selected program 500, the control circuitry 410 determines a point in time, or a time stamp, associated with the matching text. In one example, the control circuitry 410 may identify a video frame associated with the matching text, and then use a time stamp associated with that frame, such as a Presentation Time Stamp (PTS), Decoding Time Stamp (DTS), or a reference time stamp, to determine the actual start time 502B of the program.

Once the control circuitry 410 determines the actual start time 502B, the control circuitry 410 may compare the actual start time 502B with the expected start time 502A, and calculate the difference between the two. If the difference is less than some predetermined time value, such as a minute or two, than the control circuitry may determine that no changes to the recording timer 434 are required. If, instead, the difference exceeds that value, then the control circuitry 410 may add the difference to the expected end time 504A of the corresponding recording timer 434 to set what may be considered to be the actual end time 504B. In other implementations, some value other than the calculated difference may be used to adjust the expected end time 504A. The control circuitry 410 may then update the expected end time 504A as stored in the recording timer 434, thus approximating the actual end time 504B. In some embodiments, the control circuitry 410 may also trim the portion of the recording preceding the actual start time 502B of the program 500 to reduce the amount of space in the data storage 408 consumed by the portion of the recording not belonging to the selected program 500.

In one implementation, multiple recording timers 434 may be set for various programs that the user intends to record. As a result, extending the recording time of the timer 434 for the delayed program 500 may cause a conflict with a second timer 434. More specifically, the second timer 434 may be set to record a program scheduled to start shortly after the expected end time 504A of the first selected program 500 on another channel. In such instances, the control circuitry 410 may be configured to modify the first or second timer 434 to eliminate the conflict. For example, if the user has previously indicated some priority between the two programs by way of the user interface 406, the control circuitry 410 may either end the recording of the selected program 500 associated with the first timer 434 earlier, or delay the start of the recording of the program related to the second timer 434 to eliminate the conflict, or some combination thereof. In another example, the control circuitry 410 may search for another presentation time, such as a repeat showing, for either the delayed program 500 associated with the first recording timer 434 or the program associated with the second recording timer 434 via EPG data resident in the set-top box 304, and reset the timer 434 accordingly if an alternate presentation time for the program was discovered.

In some scenarios, the control circuitry 410 may not be successful in finding text data in the selected program 500 that matches the sample text data of the stored metadata 432. For example, that portion of the text data of the program 500 may be corrupted or missing entirely from the received content 310. In response, the control circuitry 410 may cease looking for a match within some predetermined time period after the expected start time 502A of the program 500, such as a half-hour, an hour, or even several hours. In addition, the control circuitry 410 may preemptively adjust the expected end time 504A component of the recording timer 434, possibly in multiple increments, during the time a match with the sample text data is not forthcoming. Also, a limit on the amount of recording extension may be imposed in case the control circuitry 410 never finds a match.

To help protect against the possibility of a match for sample text data not being found, the stored metadata 432 may include multiple text data samples. In some implementations, at least one of the unique text data samples may not appear at or near the beginning of the program 500 selected for recording. In those cases, the stored metadata 432 may include an offset, measured in terms of time (such as PTS units), number of video frames, or some other data indicating the period of time from the start of the program 500 to the location within the program 500 of the associated text data sample. Hence, once the control circuitry 410 finds the text data sample in the program 500, the control circuitry 410 may use the offset from the metadata 432 and the location within the recording 500 at which the text data sample match was found to determine the actual start time 502B of the program 500.

In a similar embodiment illustrated in FIG. 6A, the stored metadata 432 may include data that logically partitions a program 600 into a number of segments 602A-602E. Between the various segments 602A-602E, interstitials 604A-604D, such as commercial breaks, may be located. One segment 602A of the program 600 is shown in greater detail in FIG. 6B, in which an anchor video frame 701 is identified. The anchor frame 701 may be a frame at which a text data sample in the metadata 432 appears in the program 600. The metadata 432 may further include a start offset 703 indicating the time or distance from a starting frame 702 of the segment 602A to the anchor frame 701, as well as an end offset 705 specifying a time or distance from the anchor frame 701 to the segment 602A ending frame 704. Such information is useful in implementations in which the control circuitry 410 is configured to record the segments 602 while interrupting the recording operation for the interstitials 604 based on the stored metadata 432.

This particular form of metadata 432 may also be employed to determine the actual start time 612 of the program 600 as shown in FIG. 6. More specifically, the control circuitry 410 of the set-top box 304 may be configured to search for the text data sample associated with the anchor frame 701 of the first segment 602A. If found, the control circuitry 410 may utilize the position of the anchor frame 701 and the start offset 703 to determine the starting frame 702 of the first segment 602A, which is aligned with the actual start time 612 of the program 600. This information may then be used to determine the actual end time 614 and modify a recording timer for the program 600 accordingly. In the case a text data sample for a subsequent segment 602B-602E is employed for comparison, the metadata 432 may also include an offset indicating the time or distance between the start of the subsequent segment 602B-602E and the start of the program 600.

Returning to FIG. 5, depending on the location of the text data sample within a program 500, the control circuitry 410 may begin searching for the text data sample in the program 500 starting at the expected start time 502A, or starting the search as late as the expected location of the text data sample within the program 500, as indicated by an offset value in the metadata 432. The search may then progress until a match for the text data sample is found, or until some predetermined time limit is reached.

While the embodiments described to this point involve the use of a text data sample for matching with text data, such as closed captioning or subtitling, integrated with the program 500 to be recorded, other portions of the program 500 may be similarly utilized. For example, in one implementation, instead of a text data sample, the metadata 432 may include a sample audio clip, possibly of a few seconds in length, which is to be matched with a portion of the audio data of the program 500. If the control circuitry 410 finds a match, the control circuitry 410 may then adjust the ending time for the recording of the program 500 accordingly. In this case, a comparison between the sample audio clip and the audio data may be considered a match if the comparison indicates a match within some predetermined level or percentage of error in order to take normal signal noise or similar maladies into account. Use of a sample audio clip instead of a text data sample may be appropriate in cases in which closed captioning or subtitling is not available. The sample audio clip may be a unique phrase, such as an audible introduction to the show, or some other audio clip residing at the beginning of the program 500, or later therein.

Similarly, instead of either a text data sample or an audio clip, the metadata 432 may designate the actual beginning of a program 500 by way of a sample video frame, such as an introductory "splash" or title screen typically associated with a particular program 500, or another unique video frame, or set of video frames, within the program 500. In this situation, the control circuitry 410 may compare the video frames of the program 500 with the sample video frame until a match is found. Further, a video frame match may involve a complete match, a match within a certain level of error, or a match with a predetermined subset or portion of a video frame.

As with the use of text data as comparison data, the video frames or audio clips used to determine the actual start time 502A of a program 500 may reside at or near the start of the program 500, at some significant offset from the start of the program 500, or within a segment of a multi-segment program 600, as described above with respect to the use of text data.

Given the number of possible metadata 432 to be used, and the number of ways in which the control circuitry 410 may use the metadata 432 to determine the actual start time 502B of a program 500, the user may specify one or more parameters 436 by way of the user interface 406 for saving in the data storage 408. The control circuitry 410 may then perform its operations as discussed above on the basis of these parameters 436. One example of a user-defined parameter 436 may include the length of time during which the control circuitry 410 may search for a text data sample, or a sample audio clip or video frame, before stopping. Another parameter 436 may be how much of a delay in the program 500 is tolerated before the expected end time 504A of the associated recording timer 434 is modified. Other parameters 436 for directing the operation of the control circuitry 410 as described above may be set by the user in other implementations.

At least some of the embodiments presented above allow a set-top box or other media content receiving device to automatically extend a recording of a selected program or media event when the start of transmission or broadcast of the event has been delayed with little or no warning. In so doing, less user frustration due to partial recordings of favorite shows, movies, sporting events, and so on, is likely to result.

While several embodiments of the invention have been discussed herein, other implementations encompassed by the scope of the invention are possible. For example, while various embodiments have been described largely within the context of a satellite television set-top box, the design of other types of media content receivers, such as cable and terrestrial television set-top boxes, standalone DVRs, cellular telephones, PDAs, and desktop and laptop computers, that are capable of recording content for subsequent user consumption may employ various aspects of the systems and methods described above to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of extending a recording in a media content receiver of a media event that is delayed, the method comprising:

beginning a recording of media content at an expected start time for the media event based on a recording timer, wherein the recording timer indicates the expected start time and an expected end time for the media event;

after beginning the recording, analyzing the media content being recorded to determine an actual start time for the media event;

comparing the actual start time with the expected start time;

if the difference between the actual start time and the expected start time exceeds a predetermined value, adjusting the expected end time to extend the recording; and ending the recording at the adjusted end time;

receiving metadata for the media event, wherein the metadata comprises a text data sample and an offset indicating a distance from a starting frame of the media event to a video frame of the media event associated with the text data sample;

wherein the media content being recorded comprises video frames and text data to be displayed with the video frames; and wherein analyzing the media content being recorded comprises:

comparing the text data of the media content being recorded against the text data sample; and if matching text data in the text data is found for the text data sample, determining a starting frame of the video frames of the media event using a video frame of the media content being recorded that is associated with the matching text data and the offset, and using a time stamp of the starting frame to determine the actual start time.

2. The method of claim 1, wherein:

adjusting the expected end time comprises adding the difference to the expected end time.

3. The method of claim 1, wherein:
comparing the text data of the media content being recorded against the text data sample is started at the expected start time of the media event.

4. The method of claim 1, wherein:
comparing the text data of the media content being recorded against the text data sample is started at the offset after the expected start time of the media event.

5. A method of extending a recording in a media content receiver of a media event that is delayed, the method further comprising:
beginning a recording of media content at an expected start time for the media event based on a recording timer, wherein the recording timer indicates the expected start time and an expected end time for the media event;
after beginning the recording, analyzing the media content being recorded to determine an actual start time for the media event;
comparing the actual start time with the expected start time
if the difference between the actual start time and the expected start time exceeds a predetermined value, adjusting the expected end time to extend the recording;
ending the recording at the adjusted end time
receiving metadata for the media event, wherein the metadata comprises a text data sample associated with an introductory portion of the media event;
wherein the media content being recorded comprises video frames and text data to be displayed with the video frames; and
wherein analyzing the media content being recorded comprises:
comparing the text data of the media content being recorded against the text data sample, beginning at the introductory portion of the media content being recorded; and
if matching text data in the text data is found for the text data sample, using a time stamp of a video frame of the media content being recorded that is associated with the matching text data to determine the actual start time.

6. The method of claim 5, wherein:
the metadata further comprises at least one additional text data sample associated with the introductory portion of the media event; and
wherein analyzing the media content being recorded further comprises, if a matching text data in the data text is not found for the first text data sample:
comparing the text data of the media content being recorded against the additional text data sample, beginning at the introductory portion of the media content being recorded; and
if matching text data in the text data is found for the additional text data sample, using a time stamp of a video frame of the media content being recorded that is associated with the matching text data to determine the actual start time.

7. A method of extending a recording in a media content receiver of a media event that is delayed, the method comprising:
beginning a recording of media content at an expected start time for the media event based on a recording timer, wherein the recording timer indicates the expected start time and an expected end time for the media event;
after beginning the recording, analyzing the media content being recorded to determine an actual start time for the media event;
comparing the actual start time with the expected start time
if the difference between the actual start time and the expected start time exceeds a predetermined value, adjusting the expected end time to extend the recording;
ending the recording at the adjusted end time
receiving metadata for the media event, wherein the metadata comprises a sample video frame associated with an introductory portion of the media event;
wherein the media content being recorded comprises video frames; and
wherein analyzing the media content being recorded comprises:
comparing the video frames of the media content being recorded, beginning at the introductory portion of the media content being recorded, against the sample video frame; and
if a video frame of the media content being recorded matches the sample video frame within a predetermined error level, using a time stamp of the matching video frame to determine the actual start time.

8. A method of extending a recording in a media content receiver of a media event that is delayed, the method comprising:
beginning a recording of media content at an expected start time for the media event based on a recording timer, wherein the recording timer indicates the expected start time and an expected end time for the media event;
after beginning the recording, analyzing the media content being recorded to determine an actual start time for the media event;
comparing the actual start time with the expected start time
if the difference between the actual start time and the expected start time exceeds a predetermined value, adjusting the expected end time to extend the recording;
ending the recording at the adjusted end time
receiving metadata for the media event, wherein the metadata comprises a sample audio clip associated with an introductory portion of the media event;
wherein the media content being recorded comprises video frames and audio data; and
wherein analyzing the media content being recorded comprises:
comparing the audio data of the media content being recorded, beginning at an introductory portion of the media content being recorded, against the sample audio clip; and
if a portion of the audio data of the media content being recorded matches the sample audio clip within a predetermined error level, using a time stamp of a video frame of the media content being recorded that is associated with the matching portion of the audio data to determine the actual start time.

9. A method of extending a recording in a media content receiver of a media event that is delayed, the method comprising:
beginning a recording of media content at an expected start time for the media event based on a recording timer, wherein the recording timer indicates the expected start time and an expected end time for the media event;
after beginning the recording, analyzing the media content being recorded to determine an actual start time for the media event;
comparing the actual start time with the expected start time
if the difference between the actual start time and the expected start time exceeds a predetermined value, adjusting the expected end time to extend the recording;

ending the recording at the adjusted end time and in response to determining the actual start time, trimming from the recording an initial portion of the recording up to the actual start time of the recording.

10. A media content receiver, comprising:

a content input interface configured to receive multiple channels of media content from a media content source;

a content output interface configured to transmit media content for presentation to a user;

data storage configured to store recorded portions of the media content from the content input interface; and control circuitry configured to:

based on a recording timer, begin a recording in the data storage, at an expected start time of an event, of media content received over one of the multiple channels via the content input interface, wherein the recording timer indicates the expected start time and an expected end time for the event;

after beginning the recording, analyze the media content being recorded to determine an actual start time for the event;

compare the actual start time with the expected start time;

if the difference between the actual start time and the expected start time exceeds a predetermined value, adjust the expected end time to extend the recording;

end the recording at the adjusted end time receive metadata identifying at least one characteristic relating to an initial;

to analyze the media content being recorded, compare the received media content being recorded with the metadata to determine the actual start time for the event, the media content being recorded comprising video frames, the metadata comprising a sample video frame associated with a beginning portion of the media content of the event; and to analyze the media content being recorded, the control circuitry is configured to compare the video frames of the media content being recorded, starting at a beginning of the media content being recorded, against the sample video frame, and if one of the video frames of the media content being recorded is found to match the sample video frame within a predetermined error level, use the time stamp of the matching video frame to determine the actual start time.

11. The media content receiver of claim 10, wherein:

the content input interface is configured to receive the metadata and transfer the metadata to the control circuitry.

12. The media content receiver of claim 10, further comprising:

a communication interface configured to receive the metadata and transfer the metadata to the control circuitry.

13. The media content receiver of claim 10, wherein:

the media content being recorded comprises video frames and audio data associated with the video frames;

the metadata comprises a sample audio clip associated with a beginning portion of the media content of the event; and to analyze the media content being recorded, the control circuitry is configured to compare the audio data of the media content being recorded, starting at a beginning of the media content being recorded, against the sample audio clip, and if a portion of the audio data of the media content being recorded is found to match the sample audio clip within a predetermined error level, use the time stamp of a video frame associated with the matching portion of the audio data to determine the actual start time.

14. The media content receiver of claim 10, wherein the control circuitry is further configured to:

determine whether the adjusted end time would cause a recording conflict with a second recording timer; and modify at least one of the first recording timer and the second recording timer to resolve the recording conflict.

15. A media content receiver comprising:

a content input interface configured to receive multiple channels of media content from a media content source;

a content output interface configured to transmit media content for presentation to a user;

data storage configured to store recorded portions of the media content from the content input interface; and control circuitry configured to:

based on a recording timer, begin a recording in the data storage, at an expected start time of an event, of media content received over one of the multiple channels via the content input interface, wherein the recording timer indicates the expected start time and an expected end time for the event;

after beginning the recording, analyze the media content being recorded to determine an actual start time for the event;

compare the actual start time with the expected start time if the difference between the actual start time and the expected start time exceeds a predetermined value, adjust the expected end time to extend the recording;

end the recording at the adjusted end time receive metadata identifying at least one characteristic relating to an initial:

to analyze the media content being recorded, compare the received media content being recorded with the metadata to determine the actual start time for the event, the media content being recorded comprising video frames and text data to be displayed with the video frames, the metadata comprising a text data sample and an offset indicating a number of video frames from a starting frame of the media content of the event to a video frame associated with the text data sample; and to analyze the media content being recorded, compare the text data of the media content being recorded against the text data sample, and if a portion of the text data matches the text data sample, determine a starting frame of the video frames of the event using a video frame of the media content being recorded that is associated with the matching portion of the text data and the offset, and using a time stamp of the starting frame to determine the actual start time.

* * * * *